(12) United States Patent
Vanderheyden et al.

(10) Patent No.: US 7,646,562 B2
(45) Date of Patent: Jan. 12, 2010

(54) DATA STORAGE TAPE CARTRIDGE AND SYSTEM INCLUDING AN INTERMEDIATE PORTION HAVING A SERVO PATTERN

(75) Inventors: William J. Vanderheyden, Loveland, CO (US); Robert O. Wyman, Longmont, CO (US); John D. Willems, Arvada, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 425 days.

(21) Appl. No.: 11/618,013

(22) Filed: Dec. 29, 2006

(65) Prior Publication Data

US 2008/0156920 A1    Jul. 3, 2008

(51) Int. Cl.
    *G11B 5/584*    (2006.01)
(52) U.S. Cl. .............. 360/77.12; 360/72.2; 360/134; 242/332.4
(58) Field of Classification Search .......... None
    See application file for complete search history.

(56) References Cited

U.S. PATENT DOCUMENTS

| | | | | |
|---|---|---|---|---|
| 5,452,150 A | * | 9/1995 | Henneberger et al. | 360/74.4 |
| 5,576,903 A | * | 11/1996 | Brown et al. | 360/48 |
| 5,986,843 A | * | 11/1999 | Bar | 360/71 |
| 6,937,411 B2 | * | 8/2005 | Goodman et al. | 360/72.1 |
| 7,511,915 B2 | * | 3/2009 | Greco et al. | 360/75 |
| 7,556,215 B2 | * | 7/2009 | Livermore et al. | 242/348.2 |
| 2004/0032685 A1 | | 2/2004 | Trabert et al. | |
| 2007/0145172 A1 | * | 6/2007 | Vanderheyden et al. | 242/332.4 |
| 2007/0145173 A1 | * | 6/2007 | Livermore et al. | 242/348 |

* cited by examiner

*Primary Examiner*—Hoa T Nguyen
*Assistant Examiner*—James L Habermehl
(74) *Attorney, Agent, or Firm*—Brooks Kushman P.C.

(57) ABSTRACT

A data storage tape cartridge is provided with a combination tape including a data storage tape, an intermediate portion and a leader. A servo track and media information region is provided on the intermediate portion of the tape. The servo track is read by a servo track reader of a data storage apparatus. The media information region is read by the read/write head of the data storage apparatus.

19 Claims, 2 Drawing Sheets

DATA STORAGE TAPE CARTRIDGE AND SYSTEM INCLUDING AN INTERMEDIATE PORTION HAVING A SERVO PATTERN

BACKGROUND OF THE INVENTION

1. Field of the Invention

The present invention relates to a data storage tape cartridge for use in a tape drive system that includes an intermediate, or transition, portion between a data storage tape and a leader, wherein the intermediate portion has a servo track and may also have a media information region.

2. Background Art

Data storage tape cartridges provide a convenient and efficient way to store digital data. Data storage tape cartridges are stored or loaded into tape drive systems that may read and write data onto a data storage tape that is wound on a tape reel in the housing. Conventional data storage tapes include a data storage tape and a leader that is used to thread the data storage tape into the tape drive system. The use of a thick transition tape between the data storage tape and leader has been proposed in copending U.S. patent application Ser. No. 11/318,117, filed Dec. 23, 2005 that is assigned to applicants' assignee. As indicated in that application, one benefit of the inclusion of a transition tape is to reduce wear on the tape and avoiding buckling of the data storage tape as a result of interaction with the tape guides.

The thicker transition tape disclosed in the above identified application does not include any data or servo track pattern. As a result, a delay is caused during the loading process since the servo readers for the data storage tape cannot read servo tracks until the data storage portion of the tape is reached. The transition tape tends to slow loading time due to the need for the transition or intermediate tape to pass the servo readers in the tape drive system before the tape drive system can begin following the servo track. The delay caused by the transition tape is proportional to the length of the intermediate tape portion. The longer the intermediate tape portion the greater delay is encountered prior to the tape drive system being able to read the data storage tape.

Data storage tapes frequently include a media information region near the leading end thereof that is read each time a tape is loaded. The location of the media information region is generally subjected to repeated stops, starts and reversals in the direction of tape movement. Stop, starts and reversals of tape direction movement cause wear on the section of the tape containing the media information region. Excessive wear of the tape in the media information region can cause tape damage. The use of thinner data storage tapes makes the tapes more prone to damage from wear.

The above problems and others are addressed by the present invention as summarized below.

SUMMARY OF THE INVENTION

A data storage tape cartridge is provided that includes a housing within which a tape reel assembly having a hub is rotatably attached. A storage tape having a data storage portion, an intermediate portion and a leader is attached to the hub. The data storage portion of the tape is in initially wound around the hub with the intermediate portion being attached to the opposite end of the data storage portion relative to the hub. A leader is attached to the opposite end of the intermediate portion from the data storage portion. A servo pattern is provided on the data storage and intermediate portion of the storage tape. The servo pattern may be provided on the tape and intermediate portion of the tape in bulk before the cartridge is assembled.

The data storage tape cartridge may have a media information region on the intermediate portion of the data storage tape. The intermediate portion of the data storage tape is thicker than the data storage portion of the data storage tape. The servo pattern may be written in the form of at least one track that extends lengthwise on the data storage portion of the tape and on the intermediate portion of the tape. The media information region may be provided on the intermediate portion of the data storage tape and adjacent to the track in which the servo pattern is written. The media information region may be provided in at least one data band that extends lengthwise on the intermediate portion of the tape.

A method is provided for unwinding a storage tape from a hub of a tape reel assembly that is housed in the data storage tape cartridge. The data storage tape cartridge is inserted into a tape drive that has a servo track reader and a read/write head. The tape reel assembly has a length of data storage tape extending from the hub to a leading end. A transition tape that is thicker than the data storage tape is coupled at a trailing end to the leading end of the data storage tape. The transition tape extends to a leading end that is coupled to a leader. According to the method, the leader is initially threaded into the tape drive. A servo track is detected on the transition tape by the servo track reader. The servo track is demodulated to produce a servo track signal. The tape drive follows the servo track based upon the servo track signal.

The method may also include providing a media information region on the transition tape of the data storage tape. The media information region is read by the read/write head when the storage tape is loaded into the tape drive. The media information region may be provided on the transition tape of the data storage tape at a location adjacent to the servo track. The servo track may be written in the form of at least one track that extends lengthwise on the data storage portion of the tape and on the intermediate portion of the tape. The media information region may be provided in at least one data band that extends lengthwise on the transition portion of the tape wherein the method further comprises reading the media information region with the read/write head.

A tape drive system is provided that includes a data storage apparatus that may be used to read and write data onto a data storage tape. A housing is provided that may be loaded into the data storage apparatus. An inner end of the data storage tape is secured to a reel having a hub. An intermediate tape is provided that has an inner end that is secured to an outer end of the data storage tape. The intermediate tape is more durable than the data storage tape. The intermediate tape has a magnetic coating on one side on which at least one servo track may be written on the intermediate tape. A leader having an inner end secured to an outer end of the intermediate tape is provided that has an outer end that is attached to a take up reel.

The tape drive system may further comprise providing that the intermediate tape is more durable than the data storage tape because the intermediate tape is more than 50% thicker than the data storage tape. The tape drive system may also further comprise providing a media information region that is written on the intermediate tape and is read from the intermediate tape. Tape splices may be used to secure the data storage tape to the intermediate tape and to secure the intermediate tape to the leader. The take up reel may be rotatably secured to the housing that forms part of the tape cartridge or the take up reel may be part of the data storage apparatus. The intermediate tape may be between less than one meter and up to twenty meters in length. The data storage tape may have a thickness of less than 7 microns thick and the intermediate tape may have a thickness of more than 15 microns.

These and other aspects of the present invention will be better understood in view of the attached drawings and the following detailed description of the illustrated embodiments.

DETAILED DESCRIPTION OF THE ILLUSTRATED EMBODIMENT

Figure 1:
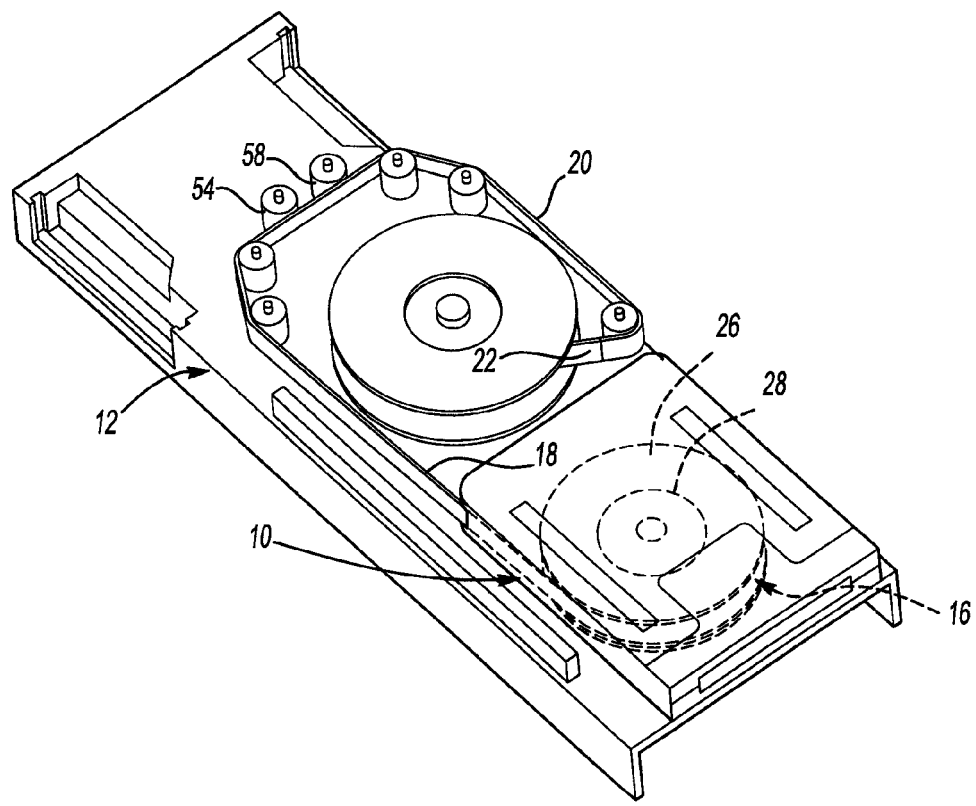
FIG. 1 is a perspective view of a data storage tape cartridge shown with a diagrammatic representation of a data storage apparatus.

Referring to FIG. 1, a data storage tape cartridge is generally indicated by reference numeral 10. The tape cartridge 10 is designed to be inserted into a data storage apparatus 12, such as a data storage tape drive that is used to read and write data to the tape cartridge 10.

A combination tape 16 is stored in the data storage tape cartridge 10. The combination tape 16 includes a data storage tape 18, an intermediate portion 20, or transition portion, and a leader 22. The combination tape 16 is wound onto a tape reel 26 with the combination tape 16 being secured to a hub 28 of the tape reel 26. The leader 22 is adapted to be captured by a drive leader that is part of the data storage apparatus 12 and that secures the tape 16 to a take-up reel of the apparatus 12.

Figure 2:
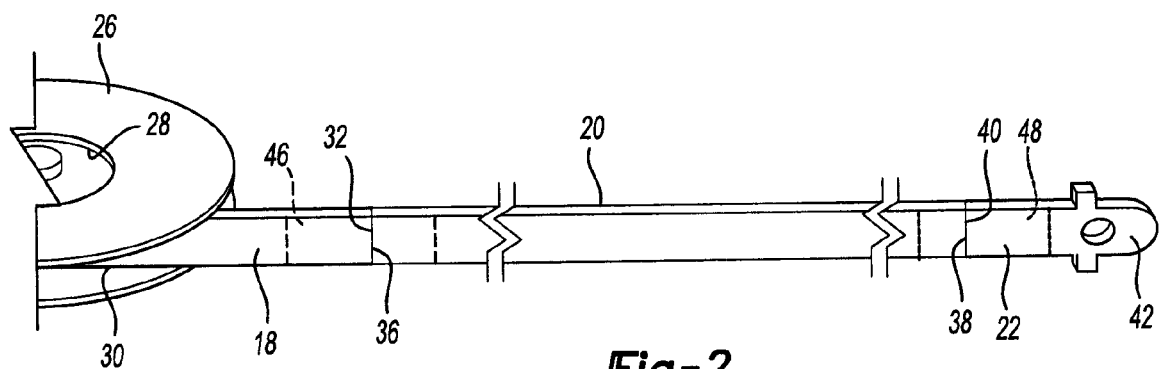
FIG. 2 is a diagrammatic representation of a reel and combination tape for use in a data storage tape cartridge.

Referring to FIG. 2, the data storage tape 18 is shown secured to the hub 28 of the tape reel 26 at an inner end 30 of the data storage tape 18. An outer end 32 of the data storage tape 18 is secured to a trailing end 36 of the intermediate portion 20 of the combination tape 16. The trailing end 36 of the intermediate portion 20 is secured to the outer end 32 of the data storage tape 18. A trailing end 40 of the leader 22 is secured to the leading end 38 of the intermediate portion 20. A tapered section of the leader 22 may be provided at the juncture of the intermediate portion 20 and the leader 22. A leading end 42 of the leader 22 is provided for leading the tape 16 into the data storage apparatus 12.

A first splice 46 is provided between the outer end 32 of the data storage tape 18 and the trailing end 36 of the intermediate portion 20. A second splice 48 is provided between the leading end 38 of the intermediate portion 20 and the trailing end 40 of the leader 22. The first and second splices 46 and 48 may be adhesive tape splices or thermal-welded splices.

The data storage tape is magnetic tape that may be about 6 microns thick and is provided with a magnetic coating on one side thereof. The intermediate portion 20, or transition tape, is substantially thicker than the data storage tape and may be about 15 microns thick. Alternatively, the transition tape, or intermediate portion 20, may be tapered in thickness. The tapered thickness may increase from the first splice 46 to the second splice 48. The thickness of the tapered transition tape may be tapered from less than 7 microns to a thickness of more than 15 microns. The leader 22 is also substantially thicker than the data storage tape 18 and may be more than 200 microns thick. The tapered section, for example, may taper from 208 microns thick to 32 microns thick. The length of the leader may be approximately 0.5 meters. The length of the transition tape may be about 0.3 to 20 meters in length or longer. The data storage tape is hundreds of meters long and may be read by the data storage apparatus 12 at a flying speed of 5000 mm per second.

Figure 3:
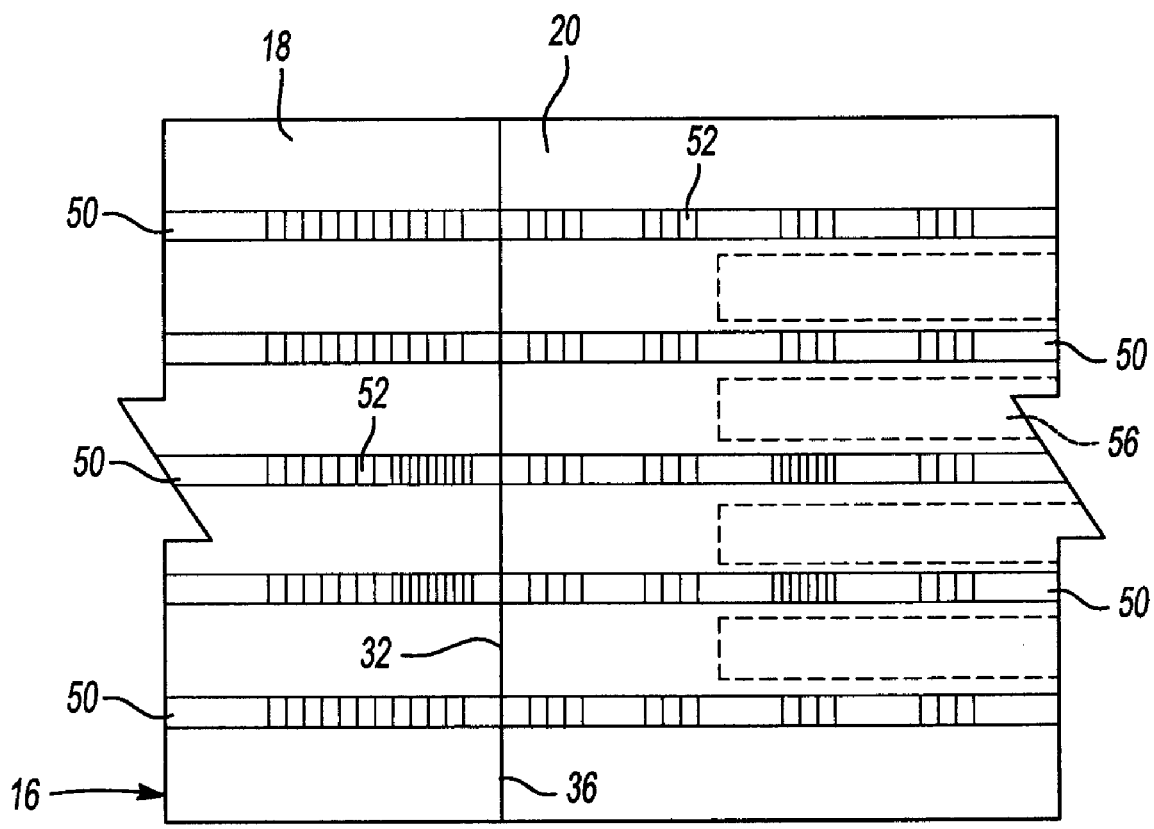
FIG. 3 is a diagrammatic representation of a section of an intermediate portion of the tape.

Referring to FIG. 3, a section of the data storage tape 18 and the intermediate portion 20 of the tape is illustrated. The portion of the tape 16 shown comprises the outer end 32 of the data storage tape 18 and the trailing end 36 of the intermediate portion 20. A plurality of servo tracks 50 are provided on both the data storage tape 18 and the intermediate portion 20. The servo tracks 50 include servo data 52 that may comprise a series of lines of other patterns that may be read by a servo track reader 54 (as shown in FIG. 1) that provide a timing-based servo pattern and an efficient means of error detection.

The intermediate portion 20 of the tape 16 may include a media information region 56 that is provided on the intermediate portion 20 between the servo tracks 50. One, or more likely several, media information regions 56 may be provided between the servo tracks 50. The media information region 56 includes information regarding the data storage tape cartridge 10, such as when the tape cartridge 10 was first written to, the number of times that the data storage tape cartridge 10 has been loaded, the number of gigabytes of data written, and the space available on the data storage tape 18 to write additional data. The media information region 56 is provided in the magnetic coating that is applied to the intermediate portion 20 of the tape 16. The media information region 56 may require approximately 1 meter of tape length. The tape used for the intermediate portion may be a polyethelene terephthalate substrate that is coated on one side to allow the servo pattern 50 and media information region to be recorded on the intermediate portion 20 of the combination tape 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage tape cartridge comprising:
a housing;
a tape reel assembly having a hub that is retained within the housing;
a storage tape having a data storage portion attached to the hub, the data storage portion of the tape being wound about the hub, an intermediate portion attached to the opposite end of the data recording portion from the hub wherein the intermediate portion of the data storage tape is thicker than the data storage portion of the data storage tape, and a leader attached to the opposite end of the intermediate portion from the data storage portion;
a servo pattern written on the data storage and intermediate portion of the storage tape.

2. The data storage tape cartridge of claim 1 wherein a media information region is provided on the intermediate portion of the data storage tape.

3. The data storage tape cartridge of claim 1 wherein the servo pattern is written in the form of at least one track that extends lengthwise on the data storage portion of the tape and on the intermediate portion of the tape.

4. The data storage tape cartridge of claim 3 wherein a media information region is provided on the intermediate portion of the data storage tape and adjacent to the track on which the servo pattern is written.

5. The data storage tape cartridge of claim 4 wherein a media information region is provided in at least one data band that extends lengthwise on the intermediate portion of the tape.

6. A method of unwinding a storage tape from a hub of a tape reel assembly that is housed in a data storage tape cartridge that is inserted into a tape drive, the tape drive having a servo track reader and a read/write head, the tape reel assembly having a length of data storage tape extending from the hub to a leading end, a transition tape that is thicker than the data storage tape and is coupled at a trailing end to the leading end of the data storage tape, the transition tape extending to a leading end that is coupled to a leader, the method comprising:

threading the leader into the tape drive;

detecting the servo track on the transition tape by the servo track reader;

demodulating the servo track to produce a servo track signal; and following the servo track based upon the servo track signal.

7. The method of claim 6 further comprising providing a media information region on the transition tape of the data storage tape, and reading the media information region with the read/write head when the storage tape is loaded into the tape drive.

8. The method of claim 7 wherein the media information region is provided on the transition tape of the data storage tape and adjacent to the servo track.

9. The method of claim 6 wherein the servo track is written in the form of at least one track that extends lengthwise on the data storage portion of the tape and on the intermediate portion of the tape.

10. The method of claim 6 wherein a media information region is provided in at least one data band that extends lengthwise on the transition portion of the tape, and the method further comprises reading and writing to the media information region with the read/write head.

11. A tape drive system comprising:

a data storage apparatus that may be used to read and write data onto a data storage tape;

a housing that may be loaded into the data storage apparatus;

a reel having a hub to which an inner end of the data storage tape is secured;

an intermediate tape having an inner end secured to an outer end of the data storage tape, the intermediate tape being more durable than the data storage tape, the intermediate tape having a magnetic coating on one side, wherein at least one servo track is written onto the magnetic coating on the intermediate tape; and a leader having an inner end secured to an outer end of the intermediate tape, wherein the leader has an outer end that is threaded into the data storage apparatus.

12. The tape drive system of claim 11 wherein the intermediate tape is more durable than the data storage tape because the intermediate tape is more than 50% thicker than the data storage tape.

13. The tape drive system of claim 11 further comprising a media information region that is written onto the intermediate tape and is read from the intermediate tape.

14. The tape drive system of claim 11 further comprising a tape splice that secures the data storage tape to the intermediate tape.

15. The tape drive system of claim 11 further comprising a tape splice that secures the intermediate tape to the leader.

16. The tape drive system of claim 11 wherein the reel is retained within the housing.

17. The tape drive system of claim 11 wherein the take up reel is rotatably secured to the data storage apparatus.

18. The tape drive system of claim 11 wherein the intermediate tape is between 0.3 meters and 20 meters in length.

19. The tape drive system of claim 11 wherein the data storage tape has a thickness of less than 7 microns thick and the intermediate tape has a thickness of more than 15 microns.

* * * * *